May 16, 1933. E. W. N. BOOSEY 1,908,819

BACK WATER FLOOR DRAIN

Filed Aug. 22, 1929

INVENTOR.
EDWARD W. N. BOOSEY
BY
ATTORNEY.

Patented May 16, 1933

1,908,819

UNITED STATES PATENT OFFICE

EDWARD W. N. BOOSEY, OF DETROIT, MICHIGAN

BACK WATER FLOOR DRAIN

Application filed August 22, 1929. Serial No. 387,573.

This invention relates to back water floor drains, the object being to provide a very simple and inexpensive device for the purpose having a peculiar form of basin and connected trap in which the trap of U form lies with the legs thereof at an angle to the vertical, the inlet basin having a wall at the same general angle whereby material flowing into the basin does not have its direction of flow varied materially in passing through the trap and in conjunction therewith providing a wall between the trap and the basin at a convenient angle to the leg of the trap adapted for the insertion of a tubular member lying parallel with the said inclined leg of the trap and carrying a swing check valve within the trap and automatically opening upon flow thereinto from the basin, the trap wall opposite the said inclined wall being enlarged to permit freedom of movement of the swing check valve. In conjunction with this arrangement the outlet leg of the trap is provided with a plugged cleanout aperture above the outlet leading to a drain with which the trap may be connected.

The above described parts are made as an integral cast structure the only machining required being for the cleanout plug, the seat for the grating covering the opening to the basin and the seat for fastening the back water check valve mounting and an aperture for a cleanout plug at the U bend part of the trap. Thus, the cost of construction is reduced below that of any structure for this purpose with which I am familiar and the device functions to an equal degree of efficiency with any of the structures of this character.

These and other objects and the several novel features of the invention are hereinafter more fully described and claimed, and the preferred form of construction of a device embodying my invention is shown in the accompanying drawing in which—

Figure 1:
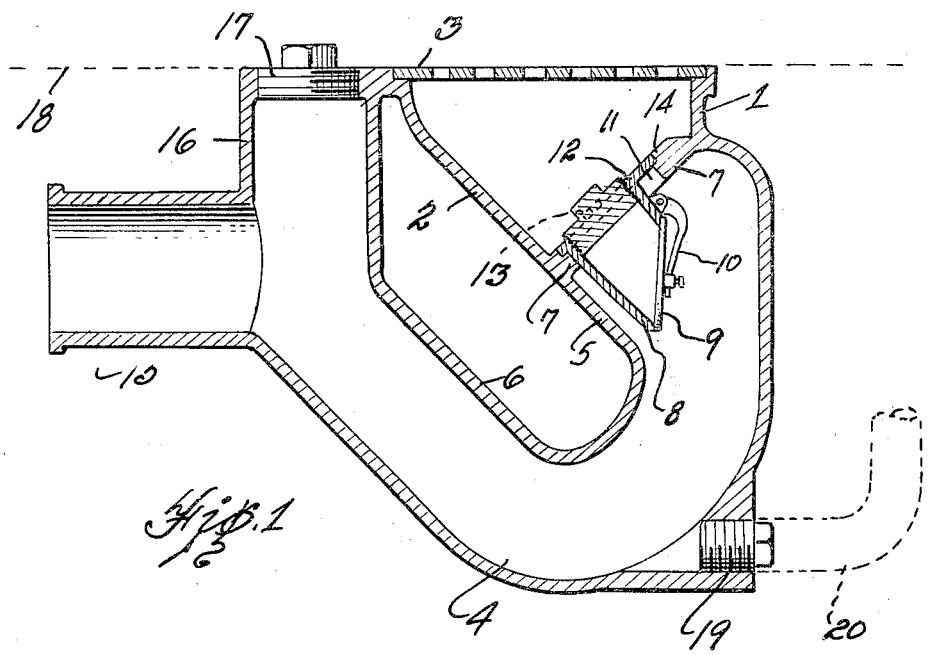
Fig. 1 is a vertical section of a back water floor drain showing my improved construction.

The device consists of a basin 1 having a wall 2 lying at an angle to the vertical and is formed with an open upper end finished or arranged to receive the grating 3 in the usual position at the floor line of a building with which the device is to be used. Formed integrally with the basin is a U shaped trap 4 having the legs 5 and 6 lying at the same angle to the vertical as the wall 2 of the basin. The basin 2 is preferably circular in form and by reason of the wall 2 lying at an angle to the vertical it extends beneath the openings of the grating to approximately its vertical center line and in one form of construction shown in Fig. 1 a wall 7 extends from the point of junction of the wall 2 of the basin with the inner wall of the leg 5 of the U trap and is apertured to receive the tubular member 8. This member 8 provides a mounting for a swing check valve 9 which is supported by the pivoted arm 10 attached to the upper side of the mounting, the aperture 11 in the wall 7 being of a size to permit the member 8 and check valve to pass thereinto in assembled relation.

Preferably the tubular member 8 has a peripheral flange 12 at the basin end which may be secured in place as by means of bolts 13 extending through the flange into the wall 7 and preferably also the wall 7 is recessed as at 14 to provide a seat for the flange 12 of the member 8. Thus the upper face of the member 7 and this flange 12 are practically flush and form in conjunction with the member 2 a part of the bottom of the basin and extends under the grating at practically the same angle as the wall 2. All material flowing into the basin through the grating thus is directed to the center of the basin bottom and to this discharge member 8 passing therethrough into the upper leg of the trap and thence about the U bend and opposite or lower leg of the trap to the outlet 15 which is formed integrally therewith and adapted for connection with the drain member.

Also formed integrally with this leg 6 of the trap and extending vertically upward from the outlet member and the leg is a cleanout portion 16 formed integrally at its upper end with the periphery of the basin and provided with a threaded aperture to receive a threaded plug 17 normally closing the opening and permitting access to the interior of the trap from the floor line indicated by the dotted lines 18 to which the member 16 extends.

At the bottom of the U bend I also preferably provide a threaded aperture to receive a plug 19 permitting introduction of a hose or if so desired a permanent valve-controlled water line indicated by the dotted lines 20 may be connected therewith.

This latter provision is preferable where the installation is so positioned as to make the plug 19 inaccessible for introduction of a hose. By a hose or by use of a permanent connection with a water line as stated, water can be introduced into the trap at this point under pressure to effectually clean the trap. Any pressure developed within the trap of course may not cause movement of the fluid upward into the basin due to the position of the check valve.

Figure 2:
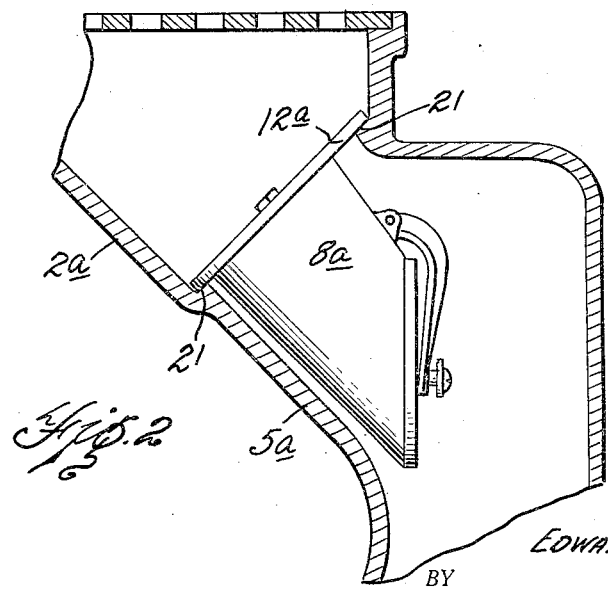
Fig. 2 shows a portion thereof illustrating an alternative form of construction.

It is not necessary to provide the wall 7 heretofore mentioned as the flange of the check valve element may be arranged to provide this wall. Such an arrangement is indicated in Fig. 2 in which the element 8a corresponding to the element 8 of Fig. 1, is formed with a flange 12a of a size to extend entirely across the open end of the leg 5 of the trap which terminates at this point with a shoulder 21 at the point of junction with the wall of the basin. The construction otherwise is practically identical with that shown in Fig. 1 and the structure, under the plan of construction shown in Fig. 2, is somewhat less in weight than that shown in Fig. 1 due to the absence of the wall 7. It is also to be noted in Fig. 2 that the wall 5a of the upper leg of the trap is not exactly in line with the wall 2a of the basin as is the case with the structure shown in Fig. 1 but there is no more obstruction to flow of material from the basin to the trap in this latter construction than is to be found in the construction shown in Fig. 1 due to the presence in the latter form of a portion of the wall 7 extending upwardly from the wall 2.

In Fig. 1 I have shown a plug 50 threaded in the basin end of the tubular member 8. A feature of the invention is involved in this arrangement in that a manufacturer may assemble this device and therefore set the valve and the plug 50 in the end of the tubular mounting therefor and ship to destination for installation as assembled in a building. Therefore any waste material falling into the trap during the process of construction of the building subsequent to the installation of the plumbing is retained in the basin and all that is required upon completion of the building is to remove the plug. Otherwise it would be necessary to remove the tubular member or corresponding element and introduce a plug in the opening therefor. Under this previous arrangement it was necessary, subsequent to the completion of a building, for the plumber to make the valve installations which by my arrangement is entirely avoided, the plumbing work being completed at the time of the original installation. In either of the forms shown in Figs. 1 and 2, the inlet leg of the trap at the point of connection with the basin has the upper wall thereof extending practically in a vertical plane rather than parallel to the inner wall 5 or 5a of the inlet leg. This provides a recess permitting the check valve to swing to open position.

The device is unique in respect to the positioning of the trap of U form with the legs lying at an angle to the vertical in parallel relation one over the other. This arrangement permits a reduction in the amount of material used over that of the ordinary vertical legged trap in that the flange of the tubular member 8a or the member 8 and the wall apertured to receive such member actually forms one of the side walls of the basin. In previous constructions the basin in addition to its side walls has a wall extending across the upper end of the trap in which the check valve mounting is positioned.

Having thus briefly described my invention, what I claim is—

1. In a back water floor drain, a basin having a horizontal inlet end and a side wall lying at an angle to the vertical and having an aperture, a U trap having one of its legs opening through the said side wall of the basin and the other leg of which lies in practically the same vertical plane as the first leg and at substantially the same angle, said second leg terminating in a vertical portion flush with the inlet end of the basin, a plug for sealing said vertical portion, and an outlet conduit at about the junction of the said vertical and angular portions of the said leg, a tubular member of less diameter than the opening in said side wall of the basin and insertible therethrough, said member having a flange for closing the said opening, and a swing check valve on the end of the member extending into the inlet end of the inlet leg normally occupying substantially a vertical plane.

2. In a back water floor drain, a basin having a horizontal inlet and converging opposite side walls therebelow, a U shaped trap member having an inlet and an outlet leg lying in practically the same vertical plane and at practically the same angle to the horizontal, the inlet leg of which is formed integrally with one of the side walls of the basin, said side wall having an opening through which material from the basin may enter said leg, the discharge end of the second leg being formed integrally with the other side of the basin from that with which the inlet leg is connected, a swing check valve consisting of a tubular member insertible from the basin side through the aperture in the said side wall and extending into the inlet leg, a swing check valve on the end of the said tubular member normally occupying a vertical plane, said leg being formed to permit the valve to swing to open position.

3. In a back water floor drain, a basin having a horizontally positioned inlet end and converging opposite side walls therebelow, a U shaped trap having an inlet and an outlet leg lying practically in the same vertical plane and at practically the same angle to the horizontal, the inlet leg having the inlet end thereof formed integrally with the outer side wall of the trap, said side wall having an opening through which material from the basin may enter the said leg, the discharge end of the second leg having a portion integral with and terminating in the same horizontal plane as the inlet end of the basin, a swing check valve consisting of a tubular member insertible from the basin side through the said opening in the outer side wall thereof and having a flange secured to the side wall to support the tubular member in place, and a swing check valve on the inner end of the tubular member normally lying in a vertical plane and adapted to open by flow of material from the basin to the leg and to close by movement of material from the leg toward the basin.

4. A back water floor drain comprising in a single integral unit a basin having a horizontal inlet end and opposite side walls lying at an angle one to the other therebelow, a U shaped trap having an inlet leg connected at its end with the outer side wall of the basin and an outlet leg parallel thereto in the same vertical plane, the axes of both legs being at the same angle to the horizontal as the other side wall of the basin and the said outer side wall being open to the inlet end of the inlet leg, a tubular member less in diameter than the opening and provided with a flange sealed in the said opening and through which the tubular member is open to the basin, the axis of the said tubular member being parallel with the axes of the two said legs of the trap, a check valve for preventing back flow from the inlet leg through the said tubular member and opening on flow of material from the basin, the discharge end of the outlet leg of the U having a vertical portion terminating flush with the upper end of the basin providing a cleanout, a plug for sealing the same, and an outlet for the said leg therebelow.

5. In a floor drain, a basin having a horizontal inlet end and converging side walls, a U shaped trap formed integrally therewith consisting of two parallel legs connected together by a bend at one end and lying at the same angle to the vertical and in approximately the same vertical plane, the inlet leg having an inlet end terminating in the outer side wall of the basin, there being an opening provided in the said outer side wall to permit flow from the basin into the leg, the outlet leg extending upwardly from the bend beneath the basin and having a Y portion at its terminal end, one part of which is approximately vertical and terminating flush with the upper end of the basin and the other part of which extends at an angle thereto at about the junction of the said vertical portion with the angular portion of the leg for connection with a drain.

In testimony whereof I sign this specification.

EDWARD W. N. BOOSEY.